March 5, 1968 — K. C. ALLISON — 3,372,248
MULTIPOSITION ROTARY ELECTRIC SWITCH
Filed Dec. 27, 1966 — 2 Sheets-Sheet 1
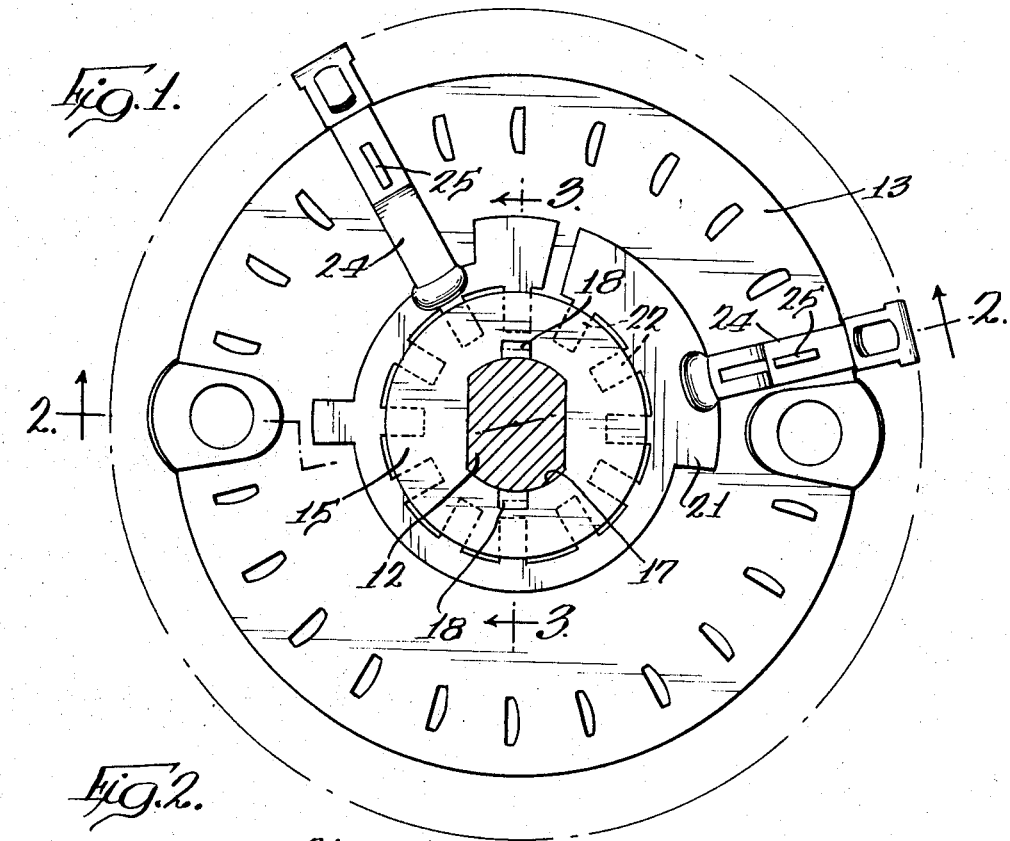
Fig.1.
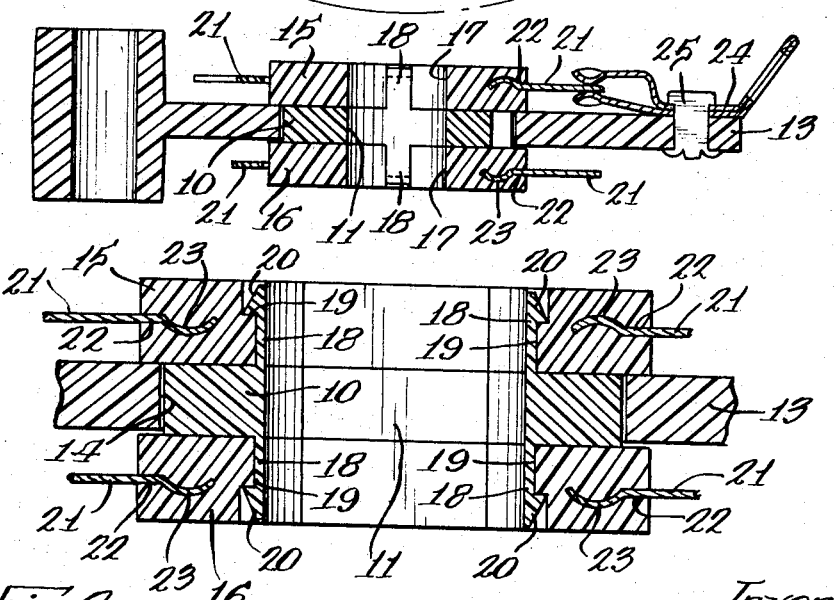
Fig.2.
Fig.3.
Inventor:
Kenneth C. Allison
By Stanley Hook
Atty March 5, 1968  K. C. ALLISON  3,372,248
MULTIPOSITION ROTARY ELECTRIC SWITCH
Filed Dec. 27, 1966
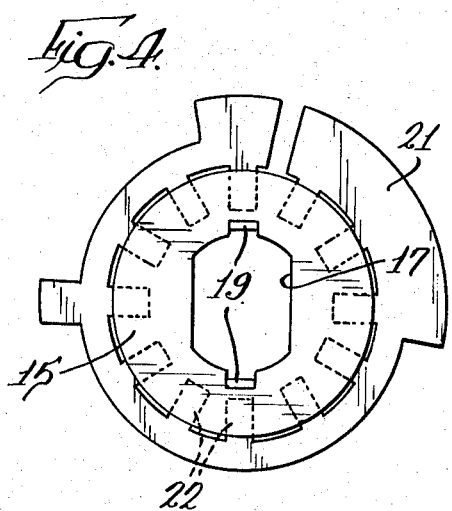
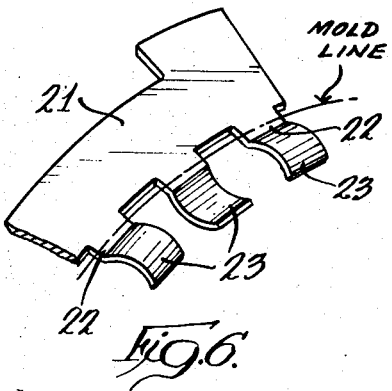
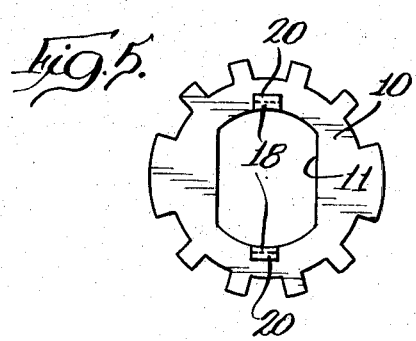
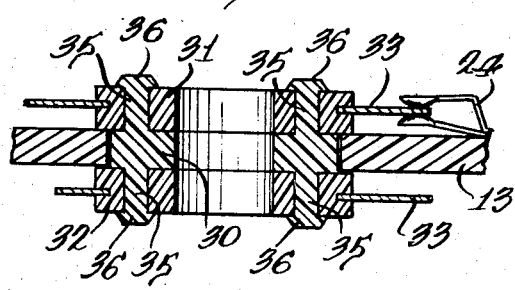
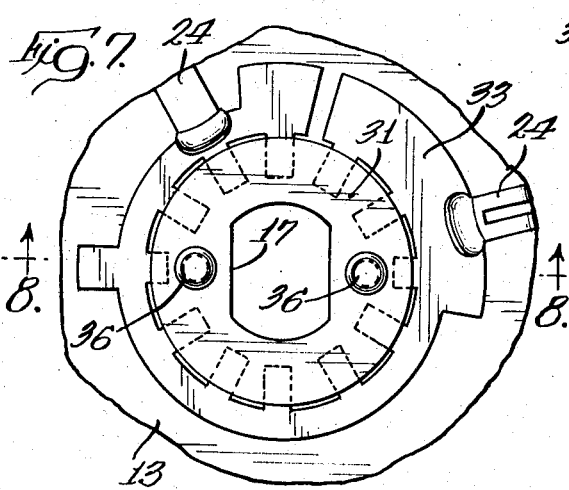
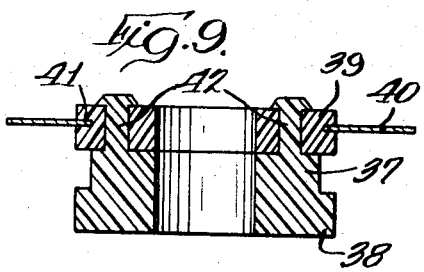
Inventor:
Kenneth C. Allison

United States Patent Office 3,372,248
Patented Mar. 5, 1968

3,372,248
MULTIPOSITION ROTARY ELECTRIC SWITCH
Kenneth C. Allison, 1546 S. Shore Drive,
Crystal Lake, Ill. 60014
Filed Dec. 27, 1966, Ser. No. 604,760
12 Claims. (Cl. 200—11)

ABSTRACT OF THE DISCLOSURE

Three section rotor assembly having a pair of rotor contact supporting members containing embedded contacts and a hub member sandwiched between said rotor supporting members and joined in fixed relation to said rotor supporting members by means of axial extensions formed integrally with said hub member.

---

The present invention relates to a multi-position rotary electric switch wherein a contact blade supported on a rotor has sequential engagement with contact members secured to a stator to establish a closed circuit through the stator contact members engaged thereby as the rotor is moved by a rotary operating shaft to which the rotor is fitted for rotation about said shaft as an axis. The area occupied by the rotor includes an opening provided in the stator about which the stator contact members are circumferentially arranged and a bearing surface with which the hub portion of the rotor within the confines of said stator opening has sliding engagement peripherally of said hub portion is defined by the edge of said opening opposite said hub portion of the rotor.

More particularly, a switch incorporating the features of this invention includes a rotor construction wherein the rotor contact blade supporting portion is molded about a portion of the contact blade and occupies a position outside the confines of the stator opening and a border section of said blade supporting portion from which said blade extends toward the area occupied by the stator contact members overlaps a face portion of the stator surrounding said stator opening.

The use of a rotor contact blade supporting portion which is molded to the blade portion within its confines provides maximum insulating characteristics. However, due to the fact that materials suitable for the production of such molded rotor contact blade supporting portions are relatively low in frictionless properties and thereby are susceptible to binding or freezing action along surfaces of the rotor facing the edge of the rotor receiving opening in the stator. While molding materials are available for the production of rotor blade supporting members having a high degree of friction free property so as to eliminate the difficulties encountered with molded rotors which are low in frictionless properties, such materials do not provide the desired rate of insulating quality.

It is accordingly an important object of this invention to provide a rotor construction wherein the rotor blade supporting portion of the rotor is defined by a member outside the confines of the rotor receiving opening in the stator and formed of molding material having the desired rate of insulating quality while the portion of the rotor within the confines of the rotor receiving opening in the stator is defined by a rotor hub formed of material having more limited insulating quality but having a high degree of lubricity as a natural or inherent quality thereof, and having a tendency to repel dust and dirt, even under exposure to abnormal use conditions of temperature, humidity and stresses so as to obtain a maximum degree of friction free action between the edge of the rotor receiving opening in the stator and the surface of the rotor facing said edge. By thus assuring dependable insulating quality in the rotor contact blade supporting portion of the rotor and smooth, relatively friction free action in relation to the stator, the operating life of a switch is lengthened.

Another object of this invention resides in providing a rotor construction wherein the rotor contact blade supporting members and a separate hub member are joined in fixed relation without the use of any metal fastening members so as to obviate undesirable current leakage between the contact blades on the rotor which can occur with the use of fastening means such as metal rivets or pins.

Other and further objects, features and advantages of the present invention will be apparent to one skilled in the art from the following description taken in connection with the accompany drawings in which:

FIG. 1 is a top plan view of a multi-position rotary switch embodying the features of the present invention.

FIG. 2 is a sectional view taken along line 2—2 of FIG. 1.

FIG. 3 is an enlarged fragmentary sectional view taken along line 3—3 of FIG. 1.

FIG. 4 is a top plan view of the rotor as it appears apart from the stator.

FIG. 5 is a similar view of the hub portion of the rotor.

FIG. 6 is a fragmentary perspective view of a portion of the rotor contact blade illustrating details of its design.

FIG. 7 is a fragmentary top plan view of a multiple-position rotary electric switch using a modified form of rotor construction in accordance with this invention.

FIG. 8 is a section taken along line 8—8 of FIG. 7.

FIG. 9 is a sectional view taken along a line drawn diametrically of a rotor construction representing a further modified form of the present invention.

As shown in FIG. 1 of the drawings, a rotor construction incorporating the features of this invention includes a rotor hub or core member 10 of nylon, Delrin or other relatively friction free material. The hub member 10 is provided with a rotor operating shaft opening 11 which when brought into coincidence provides a passage in which the flattened sides of a rotor operating shaft 12 has engagement to cause the rotor hub member 10 to be driven or rotated in response to rotation of the shaft 12 about its longitudinal axis.

A stator 13 of suitable insulating material such as molded diallyl phthalate or glass alkyd as well as other high strength thermosetting synthetic resins is provided with a central opening 14 which is of such size as to accommodate the rotor hub member 10 within its confines. The edges of the opening 14 furnish a bearing surface coincident with the circumference of a circle concentric with the axis of the shaft 12 with which bearing surface the rotor hub member 10 has sliding engagement circumferentially of its periphery when the shaft 12 is operated to rotate the hub member 10 and while the hub member occupies an operative position within the stator opening and the surfaces of the rotor hub facing in opposite directions axially of the shaft 12 are within the confines of planes containing opposite face portions of the stator bordering the opening 14.

A pair of disks 15 and 16 each provided with a rotor operating shaft opening 17 form a passage in which the flattened sides of the shaft 12 has non-rotative engagement whereby the disks 15 and 16 have driven connection with the shaft in unison with rotation of the rotor hub 10. These disks 15 and 16, as shown in FIG. 2, occupy positions in flanking relation to the rotor hub 10 and said disks are of such size as to provide border portions which overlap opposite face portions of the stator surrounding the stator opening 14. Means for securing the disks and the rotor hub member in rigidly joined relation and thereby operate to retain the rotor hub member within the confines of the stator opening 14 include coupling fingers 18 which are defined by axial extensions of the rotor hub 10 along opposite edge portions of the shaft receiving opening 11 in said rotor hub member. The coupling fingers 18 which extend in one axial direction from rotor hub member 10 have entry to pockets 19 formed in opposite edge portions of the shaft receiving opening in the disk 15 while the coupling fingers 18 extending in the direction of disk 16 have entry to corresponding pockets formed in opposite edge portions of the shaft receiving opening in the disk 16. It will be observed that the coupling fingers 18 provide a surface with which the shaft 12 has engagement to restrain withdrawal of the fingers from the pocket associated therewith in directions inwardly of the area occupied by the shaft while tab portions 20 at the axially outermost ends of the fingers 18 have overlapping engagement with surfaces of the disks associated therewith along areas bordering said pockets containing the fingers 18 which are thereby effective to lock the disks against separation from the rotor hub member without use of additional fastening means.

The disks are preferably formed of molding material having superior dielectric characteristics such as glass alkyd or diallyl phthalate or compositions of substantially equal insulating quality so as to provide a molded insulating support for contact blades 21. As shown in FIG. 3, the contact blades 21 have integral radial extensions 22 which are anchored within the body of the disks as an incident to the production of the disks in a molding operation. The extensions 22 thus embedded within the disks 15 and 16 are also provided with arched sections 23 with the arched section of alternate extensions 22 occupying reversed positions to thereby cooperate in forming a series of semi-cylindrical segments of a tunnel-like shape along a line extending circumferentially of the disk. By thus facilitating the flow of the molding material and fibers of reinforcing elements in the molding material along a continuous course coincident with the circle in which said arched sections 23 are arrayed, as an incident to the moulding of the disks about said extensions 22 of the rotor contact blades 21, the extensions 22 are linked by and interlocked with an endless rod-like reinforced area of insulating material conforming to the circular course established by said arched sections 23, and thereby provide a rotor contact blade mounting of added security.

Reference numeral 24 designates stator contact members secured to the stator 13 by suitable fastening means such as staked rivets 25. The contact members 24 are sequentially engaged by the rotor contact blade 21 secured to and extending from the periphery of the rotor disk radially opposite thereto to establish a closed circuit through said contact members 24. While the same do not appear in the sectional view illustrated in FIG. 2, it is to be understood that the rotor contact blade 21 secured to the lower rotor disk 16 cooperates with similar stator contact members occupying positions radially opposite said rotor disk 16.

A rotor assembly thus having its rotor contact blades 21 provided with insulating supports in the form of molded disks 15 and 16 of molding material such as glass alkyd or diallyl phthalate supplies superior dielectric properties notwithstanding the limited rate of frictionless quality offered by such material while the hub member 10 in the form of a molded body of nylon, Delrin or other resinous material furnishes a relatively high rate of natural lubricity so as to assure excellent low friction bearing engagement with the surface of the stator opening engaged thereby. In addition, electrical leakage is further obviated through the use of the coupling fingers 18 to establish fixed connection between the disks 15 and 16 and the hub member 10.

The rotor assembly shown in FIGS. 7 and 8 includes a molded hub member 30 and molded disks 31 and 32 of compositions corresponding respectively to that of the hub member 10 and disks 15 and 16 as described hereinbefore. The disks 31 and 32 supply insulating supports in which contact blades 33 are embedded via extensions 34 molded in the disks 31 and 32 in the manner in which the hub member and disks of the switch shown in FIGS. 1 to 6 inclusive are combined. However, in lieu of coupling fingers 18, the disks 31 and 32 have openings provided therein at opposite sides of the shaft receiving opening which register with and receive fastening spears or pins 35 formed integrally with and extending in opposite directions from the hub member 30 axially of the shaft 12, said pins 35 having exposed ends which are subjected to heat and pressure to form heads 36 that act to secure the disks 31 and 32 in fixed assembled related in positions flanking the hub member 30 without the use of separate metal fastening means.

A further modified rotor construction incorporating the features of this invention is shown in FIG. 9 wherein the rotor hub 37 is defined by an integral reduced axial extension of a disk 38 and a second disk 39 of molding material having high dielectric properties such as that indicated in reference to the disks 15 and 16 in FIGS. 1 to 6, and disks 31 and 32 in FIG. 7 and FIG. 8, provides insulating support for rotor contact blades 40. Extensions 41 embedded in the disk 39 establish a secure mounting of the blades 40 in the same manner as the rotor contact blades are secured in the rotor disks of the switch shown in FIGS. 1 to 6. Openings formed in the disk 39 register with and receive fastening pins 42 formed integrally with and extending axially from the rotor hub 37 to provide means for effecting rigid assembly of the rotor hub and disk 39. The disk 38 functions only as a retainer in cooperation with the disk 39 to maintain the rotor hub in operative relation to the rotor receiving opening of the stator with which it is associated. This form of rotor construction is used where stator contact members are confined to only the side of the stator with which the disk 39 has engagement.

While the present invention, as to its objects and advantages, has been described herein as carried out in specific embodiments thereof, it is not desired to be limited thereby but it is intended to cover the invention broadly within the spirit and scope of the claims appended hereto.

What is claimed is:

1. A rotary switch including a stator having first and second opposed faces and an opening connecting said faces, contact members secured to said first face of the stator occupying positions arranged circumferentially of said stator opening, a rotor having a contact blade supporting portion defined by a disk of molded insulating material and a rotor contact blade having a portion embedded in said disk and an exposed portion extending from the periphery of said disk, and mounting means operable to support said disk for rotation in a fixed path in overlapping relation to an area of the first face of said stator bordering said stator opening to effect sequential engagement of said rotor contact blade with said stator contact members, said mounting means including a rotor hub of insulating material of relatively greater friction-free character than the composition of said rotor contact blade supporting disk, said rotor hub occupying a position within the confines of said stator opening, a second disk to which said rotor hub is joined with the border of said second disk in overlapping relation to the second face of said stator bordering said stator opening, and non-metallic coupling means securing said rotor hub to said rotor contact blade supporting disk.

2. A rotary switch according to claim 1 wherein said non-metallic coupling means include openings in said rotor contact blade supporting disk and pins formed integrally with and extending axially of the rotor hub received in said openings.

3. A rotary switch according to claim 1 wherein said rotor hub is defined by an integral axial extension of said second disk.

4. A rotary switch according to claim 1 wherein said coupling means is defined by fingers forming axial extensions of the rotor hub along opposite edge portions of an operating shaft receiving opening in said rotor hub and pockets formed in opposite edge portions of a corresponding operating shaft receiving opening in said rotor contact blade supporting disk with which said fingers are axially aligned for reception in said pockets.

5. A rotary switch according to claim 4 wherein tab portions at the outer ends of said coupling fingers have overlapping engagement with a surface of the rotor contact blade supporting disk bordering said pockets and facing axially away from the area occupied by said rotor hub.

6. A rotary switch according to claim 1 wherein said embedded portions of the rotor contact blade are provided with arched sections which cooperate to form a tunnel-like formation circumferentially of the disk in which said portions are embedded to facilitate flow of the molding material along a continuous course coincident with the circle in which said arched sections are arrayed whereby said embedded portions of the rotor contact blade are linked by and interlocked with an endless rod-like reinforced area of insulating material conforming to the circular course established by said arched sections.

7. A rotary switch including an operating shaft, a rotor hub having a shaft receiving opening in which said shaft is non-rotatably fitted to provide for rotation of the rotor hub in response to rotation of the shaft about its longitudinal axis, said rotor hub having its outermost peripheral limits measured radially of said shaft coincident with the circumference of a circle concentric with the axis of the shaft and of substantially uniform dimension measured axially of said shaft, a stator, an opening in said stator providing a bearing surface along the edges thereof with which the rotor hub has sliding engagement circumferentially of its peripheral limits when said rotor hub occupies an operative position within the confines of said stator opening and the surfaces of said rotor hub facing in opposite directions axially of said shaft are within the confines of planes containing opposite face portions of said stator bordering said stator opening, a pair of disks non-rotatably fitted to said shaft via a shaft receiving opening in each of said disks and occupying positions in flanking relation to said rotor hub, said disks having a border portion peripherally dimensioned to overlap said opposite face portions of said stator bordering said stator opening, means for securing said disks and said rotor hub in rigidly connected relation with said border portions of the disks in overlapping engagement with face portions of said stator whereby said rotor hub is retained in said operative position within the confines of the stator opening, each of said disks being defined by a body of molded insulating material, a contact blade extending radially from each of said disks, said contact blade having an integral portion thereof embedded in the disk associated therewith incident to the production of said molded disk and contact members secured to said stator which are sequentially engaged by said contact blade of the disk facing said stator contact member incident to rotation of said rotor hub and disks.

8. A rotary switch according to claim 7 wherein said rotor hub is of relatively greater friction-free character than the composition of the rotor contact blade supporting disk.

9. A rotary switch according to claim 7 wherein said securing means joining said disks and said rotor hub in rigidly connected relation includes coupling fingers defined by axial extensions of the rotor hub along opposite edge portions of the shaft receiving opening in said rotor hub and pockets formed in opposite edge portions of the shaft receiving opening in each of said disks with which said fingers are axially aligned for reception in said pockets.

10. A rotary switch according to claim 9 wherein said rotor hub is of relatively greater friction free character than the composition of the rotor contact blade supporting disks.

11. A rotary switch according to claim 9 wherein tab portions at the outer ends of said coupling fingers have overlapping engagement with surfaces of the disks bordering said pockets and facing axially away from the area occupied by said rotor hub which are effective to prevent separation of said disks from said rotor hub axially of said shaft.

12. A rotary switch according to claim 9 wherein tab portions at the outer ends of said coupling fingers have overlapping engagement with surfaces of the disks bordering said pockets and facing axially away from the area occupied by said rotor hub which are effective to prevent separation of said disks from said rotor hub axially of said shaft, and said coupling fingers present surfaces with which the operating shaft have engagement to prevent withdrawal of said fingers from said pockets in directions inwardly of the area occupied by the shaft.

References Cited

UNITED STATES PATENTS

| 3,171,906 | 3/1965 | Allison | 200—11 |
| 3,213,211 | 10/1965 | Allison | 200—11 |
| 3,242,270 | 3/1966 | Van Volkenburg et al. | 200—11 |

ROBERT K. SCHAEFER, *Primary Examiner.*

J. R. SCOTT, *Assistant Examiner.*